US010628385B2

(12) United States Patent
Kaila et al.

(10) Patent No.: US 10,628,385 B2
(45) Date of Patent: Apr. 21, 2020

(54) VIRTUAL COLLECTION OF ENTITIES IN SYNC PROCESS

(71) Applicant: BlackBerry Limited, Waterloo (CA)

(72) Inventors: Ashish Kaila, Kirkland, WA (US); Jordan Douglas Barnes, Kirkland, WA (US)

(73) Assignee: BlackBerry Limited, Waterloo, Ontario (CA)

( * ) Notice: Subject to any disclaimer, the term of this patent is extended or adjusted under 35 U.S.C. 154(b) by 299 days.

(21) Appl. No.: 15/445,497

(22) Filed: Feb. 28, 2017

(65) Prior Publication Data

US 2017/0177614 A1    Jun. 22, 2017

Related U.S. Application Data

(63) Continuation of application No. 12/951,821, filed on Nov. 22, 2010, now Pat. No. 9,606,993.

(60) Provisional application No. 61/263,789, filed on Nov. 23, 2009.

(51) Int. Cl.

| G06F 16/00 | (2019.01) |
| G06F 16/178 | (2019.01) |
| G06F 16/44 | (2019.01) |
| G06F 16/16 | (2019.01) |
| G06F 16/438 | (2019.01) |
| G06F 3/0482 | (2013.01) |
| G06F 16/40 | (2019.01) |

(52) U.S. Cl.
CPC .......... *G06F 16/178* (2019.01); *G06F 3/0482* (2013.01); *G06F 16/168* (2019.01); *G06F 16/4387* (2019.01); *G06F 16/44* (2019.01); *G06F 16/40* (2019.01)

(58) Field of Classification Search
CPC .... G06F 16/178; G06F 16/44; G06F 16/4387; G06F 3/0482; G06F 16/40
See application file for complete search history.

(56) References Cited

U.S. PATENT DOCUMENTS

2009/0282020 A1\* 11/2009 McSheffrey .......... G06F 16/437

OTHER PUBLICATIONS

Canadian Office Action dated Feb. 19, 2014 received for Canadian Application No. 2,722,509.

\* cited by examiner

*Primary Examiner* — Usmaan Saeed
*Assistant Examiner* — Paul Kim
(74) *Attorney, Agent, or Firm* — Joe Gibbons; Fleit Intellectual Property Law

(57) ABSTRACT

Apparatus and methods to control selection of media content provide a mechanism to enhance user interaction with multimedia devices. Additional apparatus, systems, and methods are disclosed.

13 Claims, 4 Drawing Sheets

VIRTUAL COLLECTION OF ENTITIES IN SYNC PROCESS

RELATED APPLICATION(S)

This application claims the benefit of priority to U.S. patent application Ser. No. 12/951,821 filed 22 Nov. 2010, which claims the benefit of priority under 35 U.S.C. 119(e) to U.S. Provisional Patent Application Ser. No. 61/263,789 filed 23 Nov. 2009, each of the above-reference application are incorporated herein by reference in their entirety.

BACKGROUND

Access to information is an important factor in the activities of individuals in modern society. Improvements to the flow of information enhance one's ability to interact with others, to respond to changing needs, and to avail oneself of enjoyment from processing various media based information.

BRIEF DESCRIPTION OF THE DRAWINGS

Embodiments of the disclosure are illustrated by way of example and not limitation in the figures of the accompanying drawings in which.

DETAILED DESCRIPTION

Figure 1:
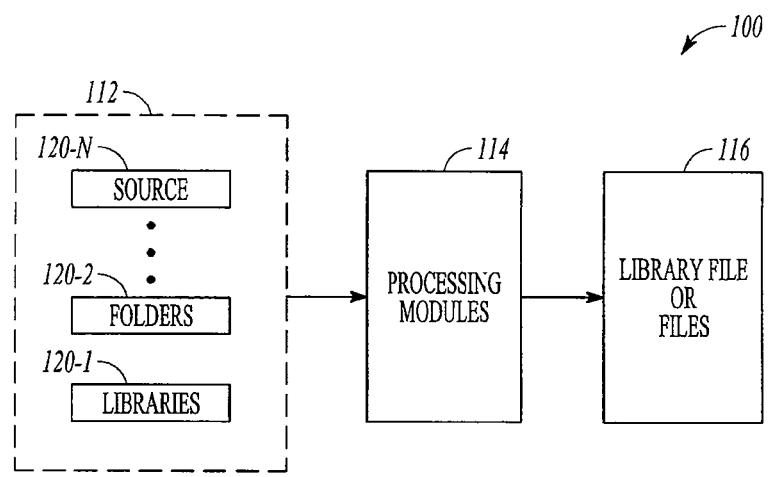
FIG. 1 is a functional block diagram of system for managing media content, according to various embodiments.

The following detailed description refers to the accompanying drawings that show, by way of illustration, details and embodiments in which the disclosure may be practiced. These embodiments are described in sufficient detail to enable those skilled in the art to practice embodiments of the disclosure. Other embodiments may be utilized and structural, logical, and electrical changes may be made without departing from the disclosed subject matter. The various embodiments disclosed herein are not necessarily mutually exclusive, as some embodiments can be combined with one or more other embodiments to form new embodiments. The following detailed description is, therefore, not to be taken in a limiting sense.

In various embodiments, media content is managed in a system. Systems and methods for managing media content may be configured such that the management may be conducted with limited user interaction and, in various embodiments, the system may perform essentially autonomously. Media is a form of general communication, information, or entertainment, which is typically intended to be used by a large audience, thought not limited to a large audience. Various media, or media types, may include, but are not limited to, music, videos, movies, music videos, television shows, interactive applications, audiobooks such as electronic books (e-books), podcasts, games, personal presentations, and other presentations. Each form of media may be referred to as media content or media art. An individual item of such media may be referred to as media content or media art. Media content may include content in any media format. Some examples of content may include, but are not limited to, audio files, video files, image files, podcast files, e-book files, multimedia files, files/folders that include one or more media files selected individually from a collection of different media files generated by a commercial entity, and files/folders that include one or more media files generated by a non-commercial entity. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, wmf, and variations thereof. Associated with a item of media art that is stored or processed on an apparatus is a media file, which when operated on by an associated playing device (player) provides an output that can be presented as communication, information, entertainment, other presentations, or combinations thereof for the user of the player.

Systems that manage media content may include various apparatus such as computer systems or other systems having hardware, software, and/or hardware and software to manage media content. In various embodiments, a personal computer (PC) can be used to manage media content and associated media files. A personal computer, as is generally known, herein refers to computing devices having an operating system (OS) such that use of the personal computer may be conducted by individuals having little or no knowledge of the basics of the underlying hardware and software that operate the PC and whose operation may be conducted without individuals typically authoring computer programs to operate the computer. Portable computers may include portable personal computers. An example of a portable PC is a laptop computer or notebook computer that typically has a display screen, keyboard, underlying hardware and software, and a display pointing device that are all integrated in a housing that can easily be carried by an individual. Some personal digital assistants (PDAs) may be viewed as a type of portable computer. In various embodiments, a PC may include instrumentality for managing media content and instrumentality to operate as a wireless server. A wireless server is a server configuration that communicates with an entity over a channel established by the entities in a wireless network. Other devices, such as mobile wireless communication devices, can be implemented to manage media content.

Various instrumentalities can be realized in hardware implementations, software implementations, and combinations of hardware and software implementations. Some portions of the instrumentalities may be described in terms of algorithms and symbolic representations of operations on data bits within a machine memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. The instrumentality may operate to process, compute, calculate, determine, display, and/or conduct other activities correlated to processes of a machine, such as a computer system or similar electronic computing device, that manipulates and transforms data represented as physical (electronic) quantities within the machine's registers and memories into other data similarly represented as physical quantities within the machine memories or registers or other such information storage, transmission or display devices. The instrumentality may provide personalized capabilities, provide a pathway to other content, or combinations thereof. The instrumentality may use distributed applications, different numbers and types of software based components that couple two or more applications to enable data transfer between the applications, hardware to provide services from a number of different sources, and may be realized on a variety of platforms such as servers and content management systems. The instrumentality may include or provide access to subroutine code, code libraries, application program interfaces such as interpreters utilizing Java EE™, Simple DirectMedia Layer™ (SDL) and DirectX™, combinations thereof, or other such electronic based functionalities.

In various embodiments, a PC manages media content in relationship to one or more mobile devices. Each mobile device can play media files and can interact with the PC with respect to the management of media content on the respective mobile device. In various embodiments, the mobile devices include instrumentalities similar to those of the PC to manage the media content on the mobile device, to browse media files in one or more PCs, and to engage with a PC in interactive management of media content on the mobile device, on the PC, and on other mobile devices in which the media content may be shared. Other apparatus configured with hardware, software, and/or hardware and software to function in a similar manner as the PC to manage media content may be used in conjunction with the mobile devices. The mobile devices may be a mobile wireless communications devices. The mobile wireless communications devices may include, but are not limited to, mobile telephones, portable computers, PDAs, and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing functionality of a personal computer, which portable phones may be referred to as smart phones.

In an embodiment, a system organizes information associated with media content from multiple media sources into a single unified library file. The information may be organized as indexed information. Managing media content is not limited to a single library file. In various embodiments, more than one library file may be utilized. Access to a library file can be provided to a number of mobile devices. The access may be provided as full access or limited access. For example, access to a library file by a mobile device may be limited to a mobile device based on whether the mobile device has one or more media players to operate on the media content. Other criteria may be used to limit access to a mobile device. In various embodiments, the library file is maintained on the system and is accessed from the mobile device remotely. In various embodiments, a library file or a modified version of a library file can be transferred to the mobile device and the mobile device can access the library file locally. The library file can be used by the mobile device to transfer media content from one or more media sources to the mobile device. The mobile device may have wireless capabilities. The mobile device may be a mobile wireless communication device.

FIG. 1 is a functional block diagram of a system 100 for managing media content. System 100 includes inputs 112, processing modules 114, and outputs 116. Inputs 112 include one or more media sources 120-1, 120-2 . . . 120-N of media content (also herein referred to as "media sources," "media source," "sources," or "source"). Media content may include content in any media format. Some examples of content may include, but are not limited to, audio files, video files, image files, and multimedia files. Audio file formats may include, but are not limited to, MP3, AIFF, WAV, MPEG-4, AAC, and Apple Lossless. Other example file formats for media content include, but are not limited to, files having extensions doc, dot, wpd, txt, xls, pdf, ppt, jpg, jpeg, png, bmp, gif, html, htm, zip, tif, tiff, wmf, and variations thereof.

Media sources 112 may include media libraries 120-1 for media players such as, but not limited to, libraries for iTunes® audio players, Windows Media Player® (WMP), RealPlayer®, and other players. Each library may include collections of various media content. A collection is a subset of the files in a library. The collections may include references to the files. Each collection may refer to anywhere from zero files to all of the files in the library. An example of a collection of a music library is a playlist. In various embodiments, inputs 112 of media content may be files within one or more folders 120-2 on a single computer system or on multiple computer systems.

Processing modules 114 include software and/or hardware that can transfer media content from media sources to devices that use the associated media. Processing modules include instrumentality to operate as a "connector," which means that the processing modules interface with media sources to collect information associated with a media file configured to operate with a specific media player. Processing modules may be arranged with a set of connectors, one for each type of media player incorporated in system 100 or used by mobile devices whose media content is managed by system 100. Processing modules 114 may include connectors to interact with mobile wireless communication devices, where the mobile wireless communication devices can also be a source of media content. Processing modules 114 may use, but are not limited to, a Windows COM interface or a XML file when connecting to various media sources. In addition, processing modules 114 may create a representation (for example, a library or libraries of information regarding the media content) of the media content available from multiple media sources. In various embodiments, media content may include information with respect to another media file that is played by a media player. For instance, a jpeg (Joint Photographic Experts Group) file may be a file of album art for songs on an album, where the media files of the songs are played on a media player.

In various embodiments, output 116 from processing modules 114 is a representation created by processing modules 114. The representation may also be maintained by processing modules 114. Output 116 may include device specific data for a mobile wireless communication device, a media player, or other destination device. Output 116 may comprise metadata, such as metadata based on user preferences or device settings. Generally, metadata is information about data. Various media content may be metadata with respect to other media content. For example, a file having a jpg file format may provide information regarding an audio file having a mp3 file format such that the jpg file is metadata for the mp3 file.

In an example embodiment, the representation may be any means for identifying the content of the media source files. In some embodiments, a library file 116 created by processing modules 114 contains metadata for the media content available in the one or more media sources 120-1 . . . 120-N, but omits the actual media content. Library file 116 may be organized using a standard format that represents the information contained in the media sources. In various embodiments, the standard format is a compressed format and/or a format that is substantially smaller than the media library itself. For example, a media library with 30 GB of audio files may be presented by processing modules 114 in a file that may be 200 KB.

In operation, system 100 for managing media content shown in FIG. 1 creates a representation of the media content available in one or more media sources 120-1 . . . 120-N and provides a means for accessing the media content by any destination device with a media player including a mobile wireless communications device. The destination device may browse the representation and may select individual media content items to copy or transfer from the media source to the destination device. After selection, all or a portion of the media content item maybe transferred to the destination device and may be played on a media player on the destination device. In various embodiments, system 100 brings content from multiple media sources into a single unified library 116 and pushes out device specific metadata from the single library to the specific destination device.

Figure 2:
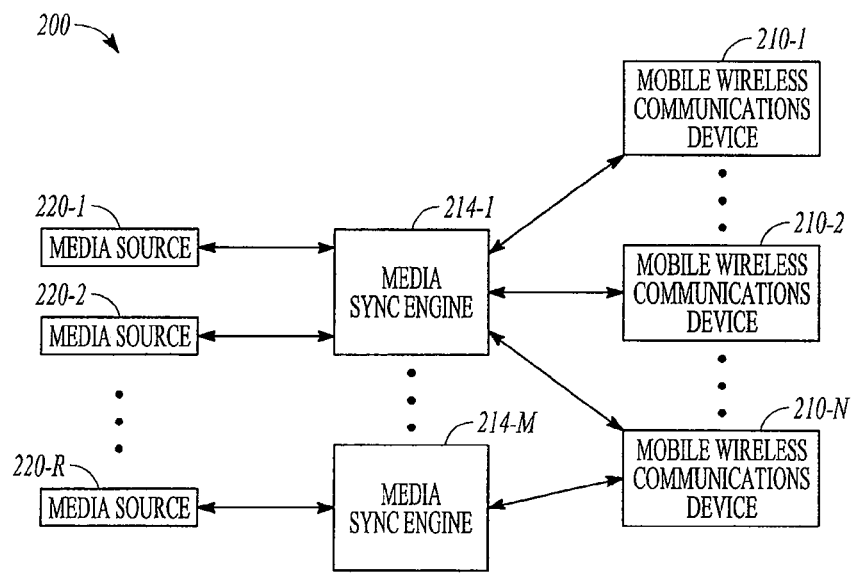
FIG. 2 shows a block diagram of an architecture for transferring media content between media synchronization engines of a system and mobile wireless communications devices, according to various embodiments.

FIG. 2 is a block diagram of an architecture for transferring media content between media synchronization engines 214-1 . . . 214-M of a system 200 and mobile wireless communications devices 210-1 . . . 210-N. The media content can be provided from media sources 220-1 . . . 220-R. Media sources 220-1 . . . 220-R can reside on system 200. The media content in media sources 220-1 . . . 220-R may be provided from various sources external to system 200. For instance, media sources 220-1 . . . 220-R can be media libraries resident on system 200 that are created as libraries to store media files provided by media stores accessed on the Internet. Media sources 220-1 . . . 220-R may contain media files loaded in the system by a user from a portable storage medium such as, but not limited to, a CD or a DVD. Mobile wireless communications devices 210-1 . . . 210-N may also be media sources. Media synchronization engines 214-1 . . . 214-M (also referred to as media sync engines or media sync applications) that operate in the transferal of a media file may also operate to manage a media library and a metadata library file associated with the media file. The media file can be operated on by a media player to provide the media content for visual and/or audio presentation to a user of system 200 or one or more of mobile wireless communications devices 210-1 . . . 210-N.

Media sync engines 214-1 . . . 214-M can create representations (such as a library file or files) identifying media content available from multiple media sources and provide data from the library to mobile wireless communications devices 210-1 . . . 210-N. In an embodiment, a media sync engine is an example of a processing module shown in FIG. 1. In various embodiments, a media sync engine provides a method to synchronize a media library, such as an iTunes® digital music library, a Windows Media Player® digital music library, or other commercial based library, with a smart phone. The files may be transferred using a wireless connection, such as a wireless wide area network, a wireless local area network such as a Wi-Fi network, a personal wireless connection such as a wireless USB connection. The files may be transferred using a wired connection such as a high speed USB connection.

Mobile wireless communications devices 210 may include, but are not limited to, mobile telephones, portable computers, personal digital assistants (PDAs), media players and other devices that may be conveniently carried by a user and provide wireless communication. Mobile telephones include wireless communication devices that have generally been referred to as cell phones. Mobile telephones may include a wide range of communication devices from portable phones with limited functionality beyond voice communication to portable phones capable of providing the functionality of a personal computer. Multiple devices of different types/capabilities may transfer media content using one or more media sync engines.

Figure 3:
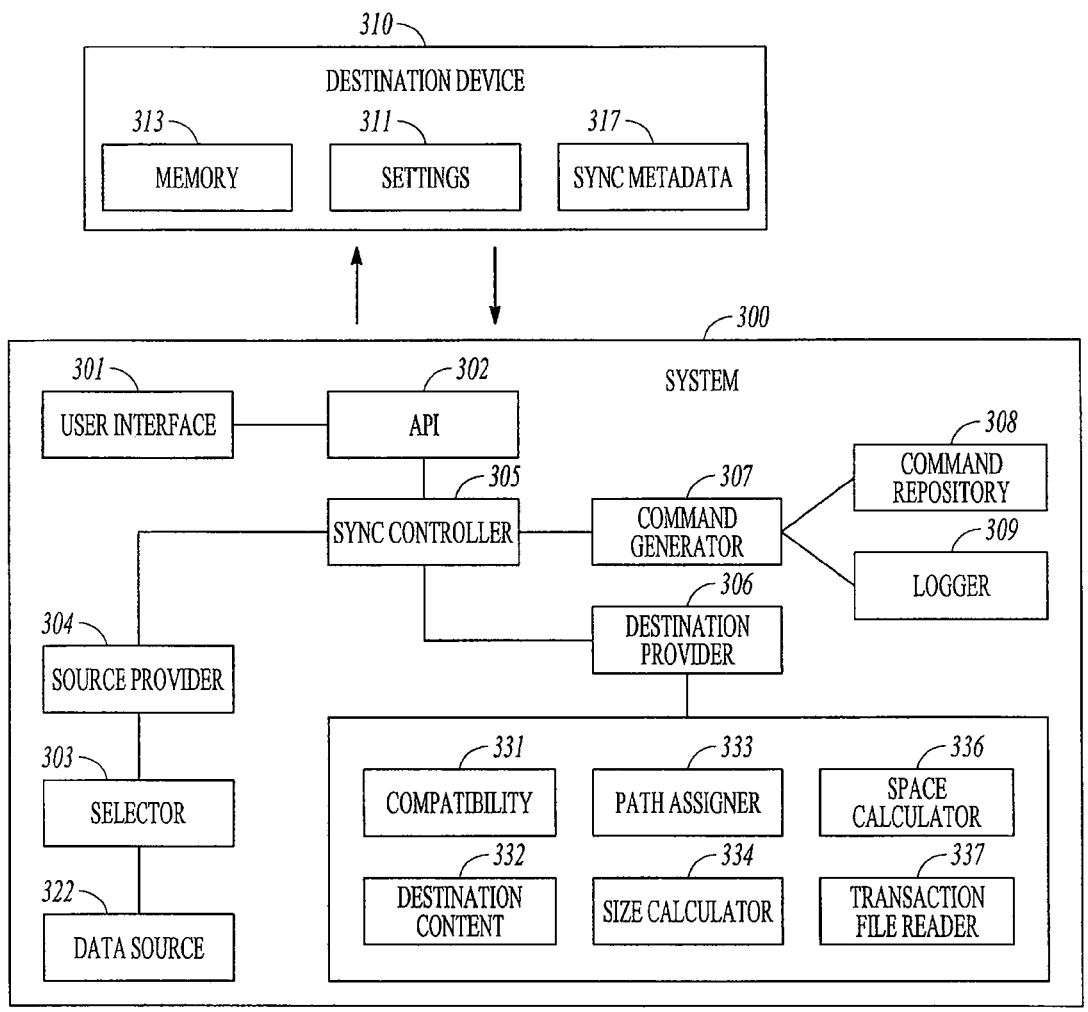
FIG. 3 shows a block diagram of a system that can synchronize the transfer of media files with a destination device, according to various embodiments.

FIG. 3 illustrates a block diagram of a system 300 that can synchronize media files with a destination device 310. System 300 can include the functionality of the processing modules 114 shown in FIG. 1 and the functionality of media sync engines 214-i of FIG. 2, according to an example embodiment. System 300 can include a user interface (UI or GUI for graphic user interface) 301, an application programming interface (API) 302, a selector 303, a source provider 304, a sync controller 305, a destination provider 306, and a command generator 307. System 300 may reside on a PC that interacts with one or more mobile wireless devices that are destination devices for media file sync.

System 300 can provide destination device 310 with media files from data source 322. Data source 322 can include a library, which may be arranged as a multimedia library, a music library, a video library, an e-book library, a documents library, or combinations thereof. Though data source 322 is shown as a single entity, it can be configured as multiple data sources. The multiple data sources of data source 322 can operate under different protocols using different data formats. Data source 322 can be configured similar to or identical to sources 120-1, 120-2 . . . 120-N of FIG. 1 and/or media sources 220-1, 220-2 . . . 220-R of FIG. 2. Data source 322 can be configured as a data source within system 300, such as a memory system or a database. Data source 322 can be configured external to but accessible by system 300.

API 302, selector 303, source provider 304, sync controller 305, destination provider 306, and command generator 307 can operate to perform multiple tasks, including, but not limited to, functioning as a sync module that includes instrumentality to conduct synchronization operations with one or more destination devices 310. Sync operations can include adding media files to and removing media files from one or more destination devices 310. System 300 can interact with destination device 310 to determine its identity and acquire information on the availability of allocated media storage on the mobile device.

Destination device 310 includes settings 311, memory 313, and sync metadata 317, which components can provide and/or store information corresponding to a sync operation with system 300. Sync metadata 317 can include metadata associated with media content stored and operated on by a media player on destination device 310. Settings 311 can include such information as a personal identification number (PIN). Other information stored in settings 311 can include, but is not limited to, identification of the OS of destination device 310, a user chosen name for destination device 310, and an identification of the version of media sync that destination device 310 is using with respect to system 300.

System 300 includes user interface 301 configured as a mechanism for a user of system 300 to interact with system 300 including providing input for a sync operation with destination device 310. A user of system 300 may receive information regarding the settings of destination device 310 via user interface 301 along with information regarding media content accessible to the user via processes of system 300 or via destination device 310. However, sync controller 305 can manage operation of a sync session such that user related operations are conducted in a background process separate from the user interface. Background operations can be conducted without user interaction, but may use user-related information that is stored in system 300 or stored in a database accessible by system 300.

Selector 303 can include a set of connectors, one or more for each type of media player incorporated in system 300 or in destination devices 310. Selector 303, using appropriate connectors, can identify specific instances of a particular type of library in data source 322. Selector 303 can use its connectors to perform a discovery function that finds individual libraries. A connector for a particular library is capable of communicating with the particular library or a file in the library using a corresponding application programming interface, protocols, file formats, etc. When an individual library is discovered, the connector can retrieve media collections from that instance of the individual library. The connectors of selector 303 may include an iTunes connector, a WMP connector, a RealPlayer connector, an autofill connector, a connector for a specific source of e-books, and various other connectors correlated to instrumentality for operating on the respective media files to provide a presentation to the user of system 300. An individual connector may be configured as a combination of a read only connector and a writeable connector. A writeable connector may perform such activities as adding a user-assigned rating for a song, creating a playlist, editing a playlist, deleting a song, etc. An autofill connector, for example, can be realized as a combination of connectors to perform discovery functions across different libraries during an autofill operation of system 300 for a specific destination device 310.

Selector 303 provides a group mechanism, in that, it functions to maintain account of selections made from data source 322. For example, if music item is chosen, selector 300 maintains the ID of the chosen music item including such information as the number of music tracks in the chosen music item. Selector 303 can be arranged to group various pieces of information data regarding chosen media files.

Source provider 304 determines the type of media data included in a sync session, where it functions as a finder, providing a discovery mechanism for connectors. Functioning as a finder, source provider 304 can identify what connectors of selector 303 are available for processing. The available connectors may register with source provider 304. If a separate connector is used for each type of library, the particular connectors that are discovered by source provider 304 can determine what type of libraries are in system 300. Source provider 304 can be arranged as an aggregation of components (one or many instances) for providing discovery mechanisms.

Destination provider 306 is similar to source provider 304 except that destination provider operates with respect to the types of media data on a particular destination device 310 with which system 300 enters into a sync session. Destination provider 306 can find connectors to interact with one or more destination devices 310, where destination devices 310 can also be sources of media content. Content from destination device 310 can be read into a database of system 300 with the content represented from destination provider 306 correlated to destination device 310.

Destination provider 306 can operate using a set of modules including compatibility 331, destination content 332, path assigner 333, size calculator 334, space calculator 336, and transaction file reader 337. Compatibility 331 can operate to provide information and/or conduct actions to reconcile compatibility such as with different versions of hardware and/or software on designation device 310. Path assigner 333 can operate as a component that calculates unique destination path of a to-be-copied media taking name collisions, associated with different media files, and operating system (OS) path limits into consideration. Size calculator 334 can operate as a component that calculates a future size of a media on a specified destination device 310 where it will be copied. Size calculator 334 can take into account compression (e.g. scaling of images), disk differences (as in physical cluster size of disk) and aids in projecting these estimates on a progress bar displayer by UI 301. Space calculator 336 can operate as to provide input as to an amount of space available for syncing. Transaction file reader 337 can operate to provide a transaction file of what was transacted as part of sync to a specific destination device 310 in a previous sync operation. Transaction file reader 337 can be used to determine a delta to be copied as part of next sync operation to the specific destination device 310. Destination content 332 can operate to provide an identification of what media content already resides on destination device 310 as part of the last sync with the specified destination device 310.

Sync controller 305 provides a path assignment function. It essentially maps the media item from data source 322 to destination device 310. Once the mapping is complete, the appropriate commands and command format is formed by command generator 307 to conduct the sync session with destination device 310.

Command generator 307 can be configured to operate in conjunction with a command repository 308 and a logger 309. Command repository 308 can operate as a repository of commands holding commands to be executed at various stages during a sync operation. Command repository 308 can be configured as an aggregation of components (one or many instances) to hold various commands and/or sets of commands. For example, command repository 308 can include a set of commands for a cleanup stage that implements the deletion of non-essential and temporary files. In another example, command repository 308 can include a set of commands for a copy stage that implements the copying of data and metadata (e.g. album artwork). Logger 309 can operate as a component that logs sync activities and usage statistics, for example, for diagnostics purposes and beta statistics.

API 302 can include instrumentality for managing functions from selection to command generation for a sync session, such that it can provide overall management of a sync session between system 300 and destination device 310. API 302 can provide a unified interface to multiple sources/libraries of data source 322. Under direction of API 302, media collected for a sync session can be collected in a sync set.

The components of system 300 shown in FIG. 3 as independent entities can be implemented in an integrated format. The various components of system 300 can be realized as software, hardware, and combinations of software and hardware. The software is implemented as instructions stored in a machine-readable storage medium that can be executed by one or more processors of system 300.

Embodiments, as illustrated in FIGS. 1-3, and similar embodiments may be implemented as a desktop application to transfer media content from multiple sources to a mobile wireless device or other destination device. The desktop application for managing media content may be launched on a PC. The desktop application may be automatically launched on startup of the PC. The desktop application may be launched on detection of a device connection to the PC. In various embodiments, a user may launch the desktop application. Alternatively, embodiments, as illustrated in FIGS. 1-3, and similar embodiments may be implemented to allow a mobile wireless device to update content already present on the mobile wireless device with media content from multiple sources.

In various embodiments, a system managing media content can be structured to operate to provide a number of different features. Content from multiple media sources may be entered into a single unified library and device specific metadata may be pushed out from the single library. A library file in a format to provide a compact representation of media metadata may be generated as output of processing modules, similar to processing modules discussed with respect to FIGS. 1-3. Varying schema can be used for choices to select, group, and rearrange data in the representation in the file format. Various features of a managing system may include maintaining representations of original source identifications so that an identifier such as an ID, a path, etc. may be used to track/manage information regarding different multiple sources of substantially the same media content. Various features of a managing system may include injecting or modifying metadata for a media file during transfer to a device. Examples of injected metadata may include album art, volume settings and other device settings, user preferences, and other parameters.

Various features of the managing system may include a simplified user interface on the PC for transferring information to the mobile device and representing information that is present on the mobile device. The UI may generate representations to provide criteria for handling user selection of media content that exceeds device capacity. In various embodiments, applications in the PC may use the information in the library of the PC to autonomously handle user selection of media content that exceeds device capacity. The UI can provide an automatic fill function, referred to herein as autofill, for a user to select such that the PC automatically handles selection of media content to transfer to the mobile device. In the various embodiments, a mobile device may be a mobile wireless communication device. A mobile wireless communication device may include instrumentality to manage media content in substantially the same manner as a PC.

Figure 4:
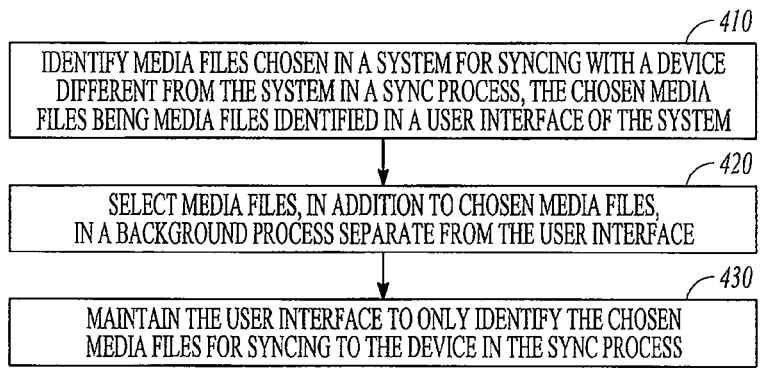
FIG. 4 illustrates features of an embodiment of a method for processing to autofill media files on a device, according to various embodiments.

FIG. 4 illustrates features of an embodiment of a method for processing to autofill media files on a device, according to various embodiments. Such methods can be performed by systems such as system 300 operating in an architecture similar to or identical to the architecture of FIG. 3. However, such methods are not limited to system 300 and the architecture of FIG. 3. At 410, media files, chosen in a system for syncing with a device different from the system in a sync process, are identified. The chosen media files are media files identified in a user interface of the system. These media files can be selected through interaction by a user via a user interface with an autofill function turned off in the user interface. An autofill function is a mechanism by which a system automatically fills an allocated storage medium, or allocated portion of the storage medium, of another device with media files in a sync process. An autofill function may operate on music files, video files, picture files, audio files, or other media files. The autofill can be performed upon activation by a user of the system, where typically some type of icon is provided on a display arranged as selectable by the user. The autofill is conducted under criteria set in the system for performing the autofill. Various types of autofill can be performed based on parameters set by the user through the user interface.

With the autofill function switched off, the chosen media files for the sync process are ones effectively selected by a user. With the chosen media files identified in the user interface, the lack of action in the user interface, presentable to the user, to remove these files can be taken to be a selection by the user. A representation of the chosen media files can be stored in a storage medium in the system allocated for a sync set. The sync set stores information on media files correlated to the sync process of the system with the device.

At 420, media files are selected, in addition to the chosen media files, in a background process separate from the user interface, such that the selection of the media files is not reflected in the user interface. These additional media files are selected to automatically fill a medium storage of the device such that the chosen media files and the selected media files are synced to the device to a maximum level available for storage of media on the device. The maximum level available can be set in the device. For example, the maximum available level may be stored in settings 311 of destination device 310 shown in the non-limiting example of FIG. 3. Exchange of information between a system, such as system 300, and destination device 310 of FIG. 3 can be conducted in the sync process.

The media files selected in addition to the chosen media files can be determined using a weighted algorithm. Various weighted algorithms can be used. For example, a weighted algorithm can be based on the sizes of the media files accessible to the system that are not included in the set of chosen media files. Given the set of available media files that are not chosen media files, media files that are larger in size than a threshold limit may be eliminated from consideration with the remaining media files randomly selected to automatically fill the available space for storage of media on the device. The threshold limit can be ignored if all the non-chosen media files available to the system can be added with the chosen files without exceeding the maximum available storage space of the device.

Other weighted algorithms can be used that include data regarding the media files, data regarding user input preferences, and/or data collected regarding perceived user preferences. The weighted algorithms that are used by a user activated autofill function of the system can be used with the autofill conducted incorporating chosen media files in the background process executed with the autofill function in a non-selected mode. Examples of such weighted algorithms are discussed later with respect to a selected autofill process.

The media files selected in addition to the chosen media files are represented in the sync set that stores information regarding the files synced to a destination device. The chosen media files and the selected media files can include music files, video files, picture files, or other media files. The media files selected in addition to the chosen media files can include an album based on one of the chosen media files. The album of media can be a fixed album created by another entity such as a commercial vendor. The album of media can be formed based on one or more of the chosen media files such that the selected media files of the album have a common characteristic. For music files, the common characteristic can be selected from one or more of a performing artist, a composer, a music genre, a time period, or combinations thereof. For video files such as movie files, the common characteristic can be selected from one or more of an actor, a writer, a director, a producer, a movie genre, a time period, or combinations thereof. For picture files, the common characteristic can be selected from one or more of an identity of a person, an identity of a group, an identify of an organization, a date, an event, a time period, or combinations thereof. Such characteristics can be stored in a library in a format that includes a unique ID for the media along with other information as IDs of sources corresponding to the media.

Upon completion of the selection of additional media files with the updating of the sync set, the media files identified in the sync set are synced to the device. The sync set can be structured to include information regarding media files with the media files themselves pulled from another storage location as the media files are transferred to the destination device. Alternatively, the sync set can be structured with the actual media files and the information regarding these media files. These synced media files include the chosen media files and the additional selected media files, as reflected in the sync set. As the sync process between the system and the device is being completed, the information regarding the additional selected media files, along with the additional selected media files if in the sync set, are removed from the sync set. The removal from the sync set can be made just prior to the transfer to the device, during the transfer, just after the transfer, or combinations thereof. After this removal, the sync set only reflects the chosen media files as being synced to the device. The sync set provides information to the user interface, which only reflects the chosen media files.

At 430, the user interface is maintained to only identify the chosen media files for syncing to the device in the sync process. The user interface is essentially frozen with respect to displaying media files for syncing the media files of the system with the device and continues to designate only media files of the system chosen for syncing with the device. During the background process to select additional media files for syncing and after the sync process has synced both the chosen media files and the selected media files to the device, the user interface only identifies the chosen media files for syncing to the device until another user initiated sync process begins. Hence, with the sync set reflecting the media files selected in addition to the chosen media files for a short period and the user interface frozen to the chosen media files, a virtual collection of entities with respect to the user interface is established in the sync process.

The next sync process can be initiated from a review of the media files on the device from the system. The syncing of information to the device can include all the information corresponding to the transferred media files in a library file format that includes unique media IDs, data paths, sources IDs, and other metadata. The system can then be synced to reflect the actual media files transferred to the device, which can be accomplished using the information, accessible to the system from the device, regarding the ID and path assignment of the media files synced to and stored on the device along with the actual media files.

Figure 5:
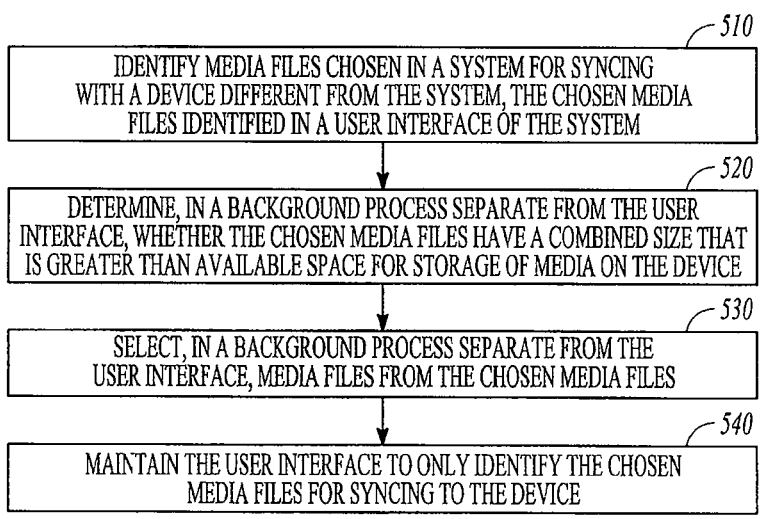
FIG. 5 illustrates features of an embodiment of a method for processing to autofill media files on a device, according to various embodiments.

FIG. 5 illustrates features of an embodiment of a method for processing to autofill media files on a device, according to various embodiments. At 510, media files chosen in a system for syncing with a device different from the system are identified, where the chosen media files are identified in a user interface of the system. The chosen media files can include music files, video files, picture files, or other media files.

At 520, a determination is made, in a background process separate from the user interface, as to whether the chosen media files have a combined size that is greater than available space for storage of media on the device. If the combined size exceeds the limits, additional processing can be conducted.

At 530, in a background process separate from the user interface, media files are selected from the chosen media files. The set of selected media files are determined to automatically fill the available space for storage of media on the device, where the set of selected media files are less than all the set of chosen media files. Various methods may be chosen to select media files from the chosen media files. As with the process to add additional media files (an up autofill), selecting media files from the chosen media files can use a weighted algorithm. Selecting media files from the chosen media files can include selecting media files having a size less than a threshold limit. The media files meeting the threshold criteria can be subjected to a random process, to a weighted algorithm, or combinations thereof.

In a non-limiting example, selecting media files from the chosen media files can include randomly selecting a first media file from the chosen media files and determining whether the first media file has a size that is less than a maximum level available for storage of media on the device. If the first media file has a size that is less than the maximum level available for storage of media on the device, this file can be marked for sync. A second media file can be randomly selected from the chosen media files and a determination can be made as to whether the second media file has a size that is less than an adjusted maximum level available for storage of media on the device. The adjusted maximum level is based on determining whether the size of the first media file is less than the maximum level. With the first file included in the sync, the maximum level is reduced for the next media file selected from the chosen media files. If the second media file has a size that is less than the adjusted maximum level available for storage of media on the device, the second media file can be marked for sync. The random selection and size determination of media files from the chosen media files can be continued until no further randomly selected media file has a size less than a final adjusted maximum level. Rather than using a random selection in the iterative process, a weighted algorithm can be used to select the media files.

At 540, the user interface is maintained to only identify all the chosen media files for syncing to the device. This process to sync the device essentially by removing ones of a set of chosen media files may be considered a down autofill.

In various embodiments, a set of media files can be marked to be coupled together for sync from a system, such as system 300 of FIG. 3, to a specific destination device such that, in a sync down process, this set of media files are selected as a priority set for sync. A priority set for sync is synced to the specific destination device, while other non-priority media files selected for sync are not synced when the maximum available storage for media on the specific destination device is less than the size of the combined media files selected for sync. For example, a user may have a collection of music tracks to be played as a set while the user performs some activity that is correlated in some manner to the collection. An example of such a correlation may include playing the specific collection of music tracks during a user's physical exercise session. A user may have a collection of new e-books to be played by the destination device in a sequence during long-distance travel. There are other numerous situations in which a user may select a set of media files to be synced to the destination device in a common sync session.

With this set of media file marked for sync, the sync down process determines an adjusted maximum available storage for media on the destination device by reducing the identified value of the maximum available storage by an amount equal to the combined size of the priority set of media files. The identified value of the maximum available storage space used at the start of the sync process can be obtained from information about the specific destination device stored in the system or from information exchanged with the specific destination device at the time of sync. After the adjusted maximum available storage based on the priority set is determined, the sync down process can determine which of the selected media files not in the priority set are marked for sync. Various sync down processes can be used such as the example sync down process discussed above.

If the priority set is larger in combined size than the maximum available storage for media on the specific destination device, a message or indication in the UI can be generated, providing a query to the user of the system regarding the lack of storage space on the specific destination device. The query can allow a user to perform actions in view of the lack of space for syncing the selected media files. The user, through information provided by the UI, can activate a process to remove existing media files on the specific destination device to allow sync of the priority set to the specific destination device. The user, through information provided by the UI, can activate a process to increase the maximum amount of storage space allocated for media files. A destination device can allocate a certain percentage of its capacity to media files, where the allocated maximum is less that the maximum of the physical capacity of the destination device. Thus, based on capacity of the components of the specific destination device, the allocated amount of storage available for media files has an upper maximum. Each type of media (music, video, pictures, podcasts, e-books, presentations, documents, etc.) can have an allocation set for the respective media.

Optionally, a decision, to remove existing media files, to increase the allocated amount of storage available on the specific destination device for the media type, and/or to perform one or more others function increasing available storage space to allow sync of the priority set to the specific destination device, can be based on user set preferences stored in a database accessible by the system. With such stored preferences, including a parameter set in the system to allow use of these stored preferences, adjustment of the specific destination device for syncing the priority set can be conducted without a query to the user during the sync process.

Various methods used to autofill, when the autofill function is selected by a user, can be applied to autofill when the autofill function is turned off on the user interface of a system and the background autofill process is executed. In various embodiments for selected autofill processes, a confidence level can be provided for each media file in a plurality of media files, where the confidence level is a measure of likeability. For example, an item of media art can be classified as liked or not liked and represented by a binary 0 or 1. Alternatively, the level of likability can be set on a graduated scale having a number of numerically assigned values. The assignment of these values can be generated by collecting information regarding media art similar to the item of media art being considered, where the collected information can be presented as frequency of use for the user correlated to the graduated scale. Generation of confidence levels is not limited to any one approach.

The confidence level for each media file can be provided using artifacts in metadata associated with the respective media file. The artifacts may reside in a metadata library of an apparatus. The plurality of media files may be categorized according to the confidence level of each media file. The apparatus may be a server, a PC, a PC including an instrumentality to operate as a wireless server, or other apparatus to run applications to manage media files. Such management of media files may be conducted through interactive activities with a user, through autonomous actions based on user settings and preferences, through autonomous activities based on information acquired in the apparatus including various confidence levels associated with the information, and combinations thereof.

Media files can be automatically selected from the plurality of media files, based on the confidence levels, to fill a media storage of a device, where the media storage is an allocated amount of a storage medium of the device. The media files selected to fill the media storage of the device are selected to fill a portion of the media storage that is determined to be available for automatic filling. The available portion may be an amount of storage remaining after a user has selected a set of media files for storage on the device. A randomizing process may be applied to a categorized set of the media files. Subsequently, a set of media of media files may be selected from the categorized set to fill the media storage of the device based on the randomizing process. A comparison of file sizes of the categorized media files can be applied with respect to a portion of the media storage that is determined to be available for automatic filling. This comparison provides an additional filter for automatically selecting the media files to fill the media storage of the device.

A list can be updated with information corresponding to the selected media files. The list can be transmitted to the device as a playlist. The device may be a mobile wireless, communication device. In a user non-selected autofill process, the playlist on the device can be different from the playlist in the system that is presented in the system's UI.

In various embodiments, a single device can request an autofill selection of media files from multiple PCs to which it can connect. Each of these autofill selections can be combined into a single autofill playlist for the device. If a new autofill selection is requested from any individual PC, the media files, in the autofill playlist, originating from that PC can be replaced with new selections, while the media files originating from other PCs can remain untouched. In an embodiment, a mobile device, while already containing a selection of media files originating from multiple PCs, may be connected, or in communication with, a PC in which another autofill process may be requested. The currently existing selection of media files from the multiple PCs forms a single playlist of media files on the mobile device, where the currently existing selection of media files may have been obtained, either partially or completely, using autofill processes of the multiple PCs. With the currently connected PC being one of the originating PCs of the playlist on the mobile device, if the autofill process is used to choose a new selection of media files from the connected PC, the media files currently residing on the mobile device that originated from the connected PC may be deleted and replaced with a new selection of media files according to the autofill process of the connected PC. All media files originating from other PCs can remain untouched. In various embodiments, a mobile device can enter into interactive communication with a PC such that an autofill process can be conducted without transferring a media file that is determined to be essentially a copy of a media file, currently on the mobile device, that was acquired from another PC.

In various embodiments, an autofill process may be applied to a set of media art selected by a user in which the combined size of the files of the media art is larger than the allotted storage space for the mobile device for which the media art was selected. The autofill process can be used to choose a subset of the media art selected by the user. If all selected media art is considered to be equally desired by the user, the subset of the selected media art can be chosen by determining which combinations of the media art allows the largest number of media files that match the allotted storage space for the mobile device. If the selected media art is considered to have different desirability relative to each other, with respect to the user, the subset of the selected media art can be chosen by ordering the selection of media art by confidence levels of likeability with the highest confidence level first and by choosing the media art starting at the first position of the ordered list, until it is determined that additional files from the list would again exceed the allotted storage space for the mobile device.

In various embodiments, media to transfer to a mobile device can be automatically and/or randomly selected. For example, in some embodiments, the selection of media art to transfer automatically to the mobile device is based on, but not limited to, a user's previously determined selection of individual media art, playlists, folders, and libraries. In another example, the individual selection of media art to transfer to the mobile device is based on, but not limited to, a random selection of individual media art, playlists, folders, and libraries. In various embodiments, a user may select individual media art to transfer to the mobile device and, then, if additional storage space is available, a media sync application, among other actions, may randomly select additional media art to transfer to the mobile device and/or apply rules/preferences to select additional media art to transfer to the mobile device. The automatic filling of the available medium for storing media files may be limited by a threshold level to which the available medium may be stored. For example, if the mobile device has allocated X amount of storage for media files, a threshold for autofilling may be set at a percentage of the X amount, for instance 90%. The threshold level can be adjusted in the apparatus that controls the autofill selection process.

In various embodiments, the individual selection of music to transfer to the mobile wireless device may be based on rules or preferences that are either set up by the user or defined by the media sync application. Some example types of rules defined by the media sync application include rules based on ratings (e.g., transferring songs based on user ratings of the song; transferring songs based on third party ratings of the song; and so on) and rules based on frequency of use (e.g., transferring songs that have been played within a recent period of time; transferring songs that have recently been added to one or more playlists, folders, or libraries; transferring songs based on frequency of play of the song by an individual user or a group of users; and so on). However, various embodiments are not limited to rules based on ratings or frequency. Rules defined by the user or media sync application may include rules defining any type of grouping of music including, but not limited to, artist, album, genre, composer, year of recording, words/phrases contained in the title or lyrics, user comments or classifications, or any other system of arranging music. In addition, rules based on frequency may be combined with rules for grouping. For example, frequency rules may be applied within each genre of music, which may be combined with frequency of rules to select a genre for download.

In various embodiments, a specifically selected list of songs may be automatically downloaded. The specifically selected list of songs may include, but is not limited to, individual songs previously selected by a user or a folder of music. A selection criterion may include a determination of the capacity of the music folder such that download of the music folder may be blocked if the contents of the music folder are too large for a target mobile wireless device. Another selection criterion may include whether or not a music folder has a threshold amount of music to provide a desired sampling of music.

In various embodiments, a randomized selection from a personal playlist may be automatically downloaded. The randomized selection may include a limited randomization in which a randomized selection of music from a selected genre, or other basis for selection, is downloaded. The selected genre, or other basis for selection, may be randomly chosen. A randomized selection from folder on the PC may be automatically downloaded. The randomized selection from a folder may include a limited randomization in which a randomized selection of music from a selected genre, or other basis for selection, is downloaded. The selected genre, or other basis for selection, may be randomly chosen.

Various criteria may be used to provide an automatic download of music. These criteria may be based on confidence levels of likeability related to, but are not limited to, the frequency of use of the song by the user, a selection according to a rating of music with higher rated music selected, selection of recently added music according to some time frame, selection of top played music from the PC based on multiple users of the PC, selection of music such that a specified amount of storage space will remain as free space in a given location of the mobile wireless device, and other features that may be quantified.

In various embodiments, confidence levels of likeability of media art can be based on features such as ratings of the media art, bit-rate for playing the media file of the media art, the length of time for playing the media art, a skip count, the instances that the user plays the media art, the relative frequency a media genre is played by the user, and other features that can be quantized to some degree by one or more applications on a PC. The confidence levels may be generated using metadata, associated with the media files, that can be autonomously collected through activities occurring on the PC and/or as metadata collected by applications running on the PC. Using these confidence levels, media files may be managed in a PC or other apparatus on behalf of the user without significant interaction with the user. In addition, such applications may be run on mobile devices such as mobile wireless communications devices.

The various confidence levels can be provided as input to the PC from various sources. For example, data correlating media art to a rating of likeability can be gathered from media-based Internet sites and publications, correlated, and entered as data in the PC. Media art such as music, movies, and books are commonly given ratings as to their quality of entertainment by different organizations. With such ratings provided on the Internet by different organizations, applications can run on the PC to acquire this rating information. In addition, a search of the Internet can be used to estimate the number of instances these rating sites are accessed to provide a relative quality level among the sources. The Internet search may be autonomously run by an application on PC that is connected to the Internet. The combination of the media art rating and the rating of the rating sources can be used to generate one form of a confidence level of likeability of the media art by the user.

A bit-rate for playing specified media art can be evaluated relative to the user's playing of the media art on the PC. For each media file of a media type played on the PC, an application on the PC can capture the number of times the media file is played. With the bit-rate for each media file known, a distribution can be generated that represents the frequency that a bit-rate is used relative to the total number of times the media type is played. The bit rate corresponding to media files that are seldom played may be given a low confidence level of likeability, while the bit rate corresponding to media files that are frequently played may be given a high confidence level of likeability.

The length of time for playing a media art may be correlated with a popularity for the media art. For example, one version of a song, having a playing length of a number of minutes, may be correlated to the popularity of the song as demonstrated by the amount of sales of the song over a length of time. Publications may publish the number of sales of the song, which may be collected by a search over the Internet. Alternatively, such data may be entered into the PC as data stored to be used by applications on the PC relative to the media files being managed by the PC. The Internet may be monitored for the public playing of the songs stored in the PC, with each occurrence being collected. Since an Internet source may not play a song for the total length of the song, a threshold may be set such that if the length of time that the song is played on the Internet is greater than the threshold, the song is considered as having been played. Since a song may have different versions corresponding to different playing times, each of the multiple versions may be taken as a song different from the other versions of the song to collect the data related to playing time monitored on the Internet. The length of play time corresponding to media files that are seldom purchased or played publicly may be given a low confidence level of likeability, while the length of time corresponding to media files that are frequently purchased or played publicly may be given a high confidence level of likeability.

A skip count, herein, is a count of the number of times a media art, which is in a ordered collection of media art, is not played during the playing of the ordered collection of media art on a PC. With a specific media art being at a $k^{th}$ position in the ordered collection, activity by a user that plays the media art at the (k+1) position of the ordered collection after the playing the media art at the (k−1) position can be monitored and a count stored in the PC can be incremented. Such an activity indicates that the user has skipped over the specific media art. For example, a user may not particularly like a song at track 2 of a particular album and may control the application on the PC playing the album to skip over song at track 2 of a particular album. However, there may be reasons for skipping over track 2 other than likeability of the song. To make an estimate of the likeability, in addition to maintaining a skip count for a specified song, a skip count is maintained along with a count of the number of times the album (an ordered collection of songs) is played on the PC. For each song on the album, the percentage of times that the song is skipped relative to the number of times the song is played can be determined and used as a statistic. The distribution of these percentages among the songs of the album can be determined and each song can be assigned a confidence level for likeability relative to the given album.

Another confidence level for likeability can be generated by taking a count of the number of times a particular album is played relative to the other albums played on the PC. This confidence level can be used as one data point when auto-filling based on the entire music library on the PC. A statistic related to a count of the number of times a particular album is played can also be categorized according to genre of music played. The count of the number of times this particular album is played relative to other albums of the same genre played on the PC can be collected. Based on the frequency of play, statistics can be generated as data points for terming a confidence level of likeability to be used in autofilling a playlist and/or downloading a set of media files to a device.

The instances that a user plays a given media art may be collected on the PC and the count can be used in providing a confidence level of likeability. For example, the number of times a user plays a song, independent of whether the song is on an album, can be collected along the total number of times that the user plays songs on the PC. The collected number of times a user plays a song relative to the total number of times that the user plays songs can be used as another data point to determine a confidence level. In addition, the number of times a user plays a song, independent of whether the song is on an album, can be collected along the total number of times that the user plays songs of the same music genre on the PC.

The various features to provide characteristics to generate confidence levels can also be categorized with respect to time intervals when the media art was played. Each time interval can be given a weight. These weights can be normalized with respect to the number of time intervals considered. For instance, four intervals can be assigned weights of 0.1, 0.2, 0.3, and 0.4 with 0.4 assigned to the time interval closest to a current time and 0.1 assigned to the time interval farthest from the current time, as a possible indication of popularity. In addition, the same weights may be assigned to the same time intervals in reverse order as a possible indication of whether the user may desire a change. Then, the popularity weight and chance weight can be assigned a weight with respect to each other, and a confidence level can be generated from a combination of the different weights.

The various confidence levels of likeability of different features for each media art may be treated similar to probabilities. For example, a combined confidence level may correspond to the occurrence of two independent features, and then the confidence level may be realized as the product of the confidence levels of the two features. An overall or combined confidence level of likeability can be generated by combining the respective confidence levels of the different features. The combined confidence level may be realized as an average of the confidence levels of the different features. In addition, the confidence levels may be expressed by a base 2 logarithm to allow many orders of magnitude of confidence to be efficiently expressed and compared. Further, each feature, such as ratings of the media art, bit-rate for playing the media file of the media art, the length of time for playing the media art, a skip count, the instances that the user plays the media art, the relative frequency a media genre is played by the user, and other quantized features, can be provided weights with respect to each other. These feature weights may also be treated in a manner similar to probabilities. A combined confidence level may be realized as a weighted average of the confidence levels of the different features. The various applicable weighted data points can be combined for each media art to assign an overall level of confidence with respect to the media art within its type of art. For instance, confidence levels of likeability can be applied, but not limited to, songs relative to other songs, movies relative to other movies, and audio books to other audio books.

The assigned weights and confidence levels can be stored in the PC and accessed when an application applies these weights and confidence levels to operate on the media files managed by the PC. In addition, the assigned weights and confidence levels may be varied. Sets of assigned weights and confidence levels may be stored to account for variances in the collected data and different views proportioning the features to assign weights and confidence levels. In forming an autofill of media art for a device at different times, different sets of assigned weights and confidence levels can be used. In addition, each set may be given a weight. A random number generator may be used to select a particular set.

The confidence levels for likeability can be used in a number of ways to provide an autofill of media files for a device. For instance, for a playlist of songs, the list of song tracks can be generated. A random number can be generated and compared to the confidence level of a song on the list. If the random number is less than the confidence level, the song can be selected for the playlist. In addition, if the size of the media file for the song is less than the available space in the allotted storage capacity for music media files on the device, the song is placed on the playlist. When the song is placed on the playlist, a count or measure of the available storage space on the device is decreased by the size of the media file of the song placed on the playlist. If the random number was greater than the confidence level, the song is not selected for the playlist. A random number is generated for another song and compared with the confidence level of this song with the song placed on the playlist only if the random number is less than the confidence level of this song and the music file for the song is less than the current available storage space on the device. If the media file is large than the available storage space, the song is not placed on the playlist and another song is evaluated with respect to its confidence level and the amount of available space in the allotted storage capacity. A playlist may be generated in which the selected songs do not completely fill the allotted capacity as a result of the selection process. Various permutations of this process may be used, such as ordering the list of songs by confidence level before beginning the use of the random number generator. Also, the comparison of the random number with the confidence level may be made with respect to selection corresponding to the random number being greater than the confidence level. In various embodiments, prior to the selection process, all songs having a confidence level less than a threshold confidence level may be eliminated for consideration in the autofill process.

Other autofill procedures may be implemented. For autofilling a playlist of songs, the songs may be ordered by their confidence levels. Filling the playlist may be realized by comparing the size of the media file with the allotted storage capacity for music media files on the device. If the size of the media file is less than the allotted storage capacity, the song is added to the playlist and a count of the allotted storage is decreased by the amount of media file of the selected song. If the size of the media file is greater than the allotted storage capacity, the song is not added to the playlist and the next song on the ordered list is evaluated with respect to the current count of the allotted storage. The process continues until the playlist is full of songs such that the size of the combination of selected media files is less than the actual allotted storage capacity of the device determined at the start of the process and each of the songs on the ordered list not selected for the playlist has a file size that is greater than the difference between the actual allotted storage capacity and the size of the combination of selected media files. In various embodiments, prior to the selection process, all songs having a confidence level less than a threshold confidence level may be eliminated for consideration in the autofill process.

Other procedures for selecting media art for a playlist using confidence levels associated with the media art may be implemented for an autofill process. In various embodiments, modifications to the various procedures may be made such that the autofill may be conducted within a selected genre of the media art to autofill just with media art of the selected genre. A confidence level of likeability can be assigned to the different genres of a media art and an autofill by genre may be conducted beginning with selection of a genre using a random process to select the genre based on the confidence levels of likeability of the genres. The use of confidence levels can be adjusted to limit the factors contributing to the confidence levels to those that are appropriate for selection of genres as the basis for autofill. In various embodiments, modifications to the various procedures may be made such that the autofill may be conducted based on other features of a media art such as, but not limited to, play length and bit-rate for playing the media art, where the use of confidence levels is adjusted to limit the factors contributing to the confidence levels to those that are appropriate for the feature selected as the basis for autofill. The feature selected as the basis for the autofill process may also be selected using a random process with respect to the confidence levels of the feature types with respect to each other.

In various embodiments, transfer/sync of multimedia files, audio files, video files, and/or combinations thereof between a computer (and associated media managers of the computer) and a mobile wireless communications device may be accomplished using a number of mechanisms. The transfer/sync between the mobile wireless communications device and the wireless server may be accomplished through a wired USB connection or a wireless USB connection. The transfer/sync between the mobile wireless communications device and the wireless server may be accomplished through a Wi-FI communication session. The transfer/sync between the mobile wireless communications device and the wireless server may be accomplished over wide area network (WAN) such as a wireless network.

Figure 6:
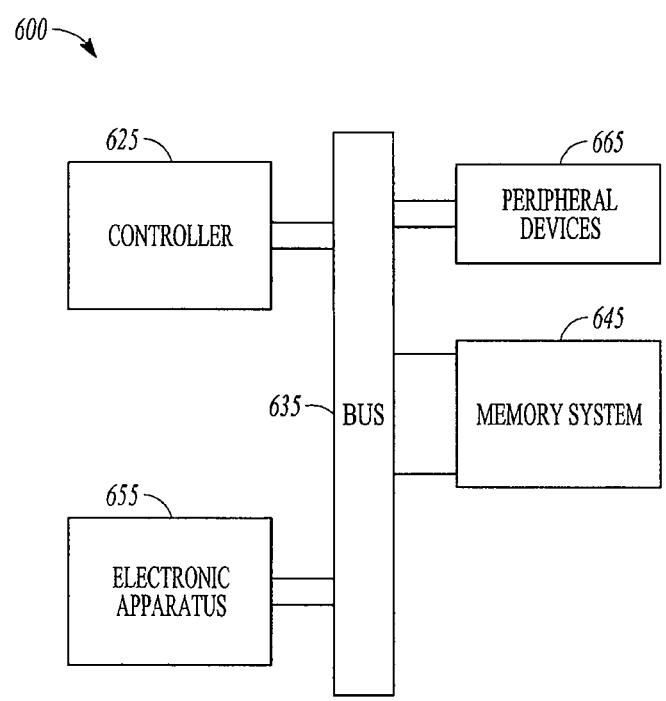
FIG. 6 depicts a diagram of an embodiment of a system, having a controller and a memory system, that can synchronize the transfer of media files with a destination device, according to various embodiments.

FIG. 6 depicts a diagram of an embodiment of a system 600 having a controller 625 and a memory system 645. System 600 also includes electronic apparatus 655 and a bus 635, where bus 635 provides electrical conductivity among the components of system 600. In an embodiment, bus 635 includes an address bus, a data bus, and a control bus, each independently configured. In an alternative embodiment, bus 635 uses common conductive lines for providing one or more of address, data, or control, the use of which is regulated by controller 625. Bus 635 may be realized as multiple busses. In an embodiment, electronic apparatus 655 is additional memory configured in a manner similar to memory system 645. In an embodiment, additional peripheral device or devices 665 are coupled to bus 635. In an embodiment, peripheral devices 655 include displays, additional storage memory system, and/or other control devices that may operate in conjunction with controller 625 and/or memory system 645. A display in peripheral devices 655 can be used to operate a user interface. In an embodiment, controller 625 is realized as one or more processors.

Controller 625 and memory system 645 can be arranged to manage media content and associated information on system 600. In an embodiment, system 600 is arranged as a PC. The PC may include instrumentality distributed throughout the PC to operate as a wireless server. System 600 arranged as a PC can operate according to any of the various embodiments discussed herein to manage media content and associated information within the PC and/or in conjunction with one or more mobile devices such as mobile wireless communications devices.

In an embodiment, system 600 is arranged as a mobile device. The mobile device may be a mobile wireless communications device. System 600 arranged as a mobile device can operate according to any of the various embodiments discussed herein to manage media content and associated information within the mobile device, and/or in conjunction with a PC or other apparatus having software and/or hardware to manage media content.

Various embodiments or combination of embodiments for apparatus and methods for a system, such as a PC, to manage media content, as described herein, can be realized in hardware implementations, software implementations, and combinations of hardware and software implementations. These implementations may include a machine-readable medium having machine-executable instructions, such as a computer-readable medium having computer-executable instructions, for operating the system in a relationship with one or more mobile devices such that media content and associated information is managed between the system and the mobile device. The communications of the system with a mobile wireless communications device can be conducted on a secured basis. The machine-readable medium is not limited to any one type of medium. Machine-readable storage media may include, but are not limited to, solid-state memories, optical media, and magnetic media. Non-limiting examples of machine-readable storage media include, but are limited to, hard disks, removable magnetic disks, removable optical disks (e.g., compact disks and digital video disks), magnetic cassettes, memory cards, memory sticks, Random Access Memories (RAMs), Read Only Memories (ROMs), and other storage media.

Various embodiments or combination of embodiments for apparatus and methods for a mobile device, such as a mobile wireless communications device, as described herein, can be realized in hardware implementations, software implementations, and combinations of hardware and software implementations. These implementations may include a machine-readable medium having machine-executable instructions, such as a computer-readable medium having computer-executable instructions, for operating the mobile device to manage its media content and associated information within the mobile device, in conjunction with a system, such as a PC, and/or with respect to other mobile devices. The communications between a mobile wireless communications device and the system can be conducted on a secured basis. The machine-readable medium is not limited to any one type of medium. Machine-readable storage media may include, but are not limited to, solid-state memories, optical media, and magnetic media. Non-limiting examples of machine-readable storage media include, but are limited to, hard disks, removable magnetic disks, removable optical disks (e.g., compact disks and digital video disks), magnetic cassettes, memory cards, memory sticks, Random Access Memories (RAMs), Read Only Memories (ROMs), and other storage media.

Although specific embodiments have been illustrated and described herein, it will be appreciated by those of ordinary skill in the art that any arrangement that is calculated to achieve the same purpose may be substituted for the specific embodiments shown. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
   identifying media files which were chosen in a system for syncing with a device different from the system, the chosen media files being media files identified in a user interface of the system;
   determining whether the chosen media files have a combined size that is greater than available space for storage of media on the device; and
   in response to the combined size of the chosen media files being greater than available space for storage of media on the device, selecting media files from the chosen media files to automatically fill the available space for storage of media on the device, the selected media files being less than all the chosen media files by
   randomly selecting a first media file from the chosen media files;
   determining whether the first media file has a size that is less than a maximum level available for storage of media on the device and marking the first media file for sync if the first media file has a size that is less than the maximum level available for storage of media on the device;
   randomly selecting a second media file from the chosen media files;
   determining whether the second media file has a size that is less than an adjusted maximum level available for storage of media on the device, the adjusted maximum level based on determining whether the size of the first media file is less than the maximum level and marking the second media file for sync if the second media file has a size that is less than the adjusted maximum level available for storage of media on the device; and
   continuing the random selection and size determination of media files from the chosen media files until no further randomly selected media file has a size less than a final adjusted maximum level.

2. The method of claim 1, wherein selecting media files from the chosen media files includes selecting the media files using a weighted algorithm.

3. The method of claim 1, further comprising:
   maintaining the user interface to only identify all the chosen media files for syncing to the device.

4. The method of claim 1, wherein selecting media files from the chosen media files includes selecting the media files having a size less than a threshold limit.

5. The method of claim 1, wherein the chosen media files and the selected media files include music files.

6. A non-transitory machine-readable storage medium that stores instructions, which when the instructions are executed by a processor, cause the machine to perform operations comprising:
   identifying media files which were chosen in a system for syncing with a device different from the system, the chosen media files being media files identified in a user interface of the system;

determining whether the chosen media files have a combined size that is greater than available space for storage of media on the device; and in response to the combined size of the chosen media files being greater than available space for storage of media on the device, selecting media files from the chosen media files to automatically fill the available space for storage of media on the device, the selected media files being less than all the chosen media files by randomly selecting a first media file from the chosen media files;

determining whether the first media file has a size that is less than a maximum level available for storage of media on the device and marking the first media file for sync if the first media file has a size that is less than the maximum level available for storage of media on the device;

randomly selecting a second media file from the chosen media files;

determining whether the second media file has a size that is less than an adjusted maximum level available for storage of media on the device, the adjusted maximum level based on determining whether the size of the first media file is less than the maximum level and marking the second media file for sync if the second media file has a size that is less than the adjusted maximum level available for storage of media on the device; and continuing the random selection and size determination of media files from the chosen media files until no further randomly selected media file has a size less than a final adjusted maximum level.

7. The non-transitory machine-readable storage medium of claim 6, wherein the instructions include selecting the media files using a weighted algorithm.

8. The non-transitory machine-readable storage medium of claim 6, further comprising:

maintaining the user interface to only identify all the chosen media files for syncing to the device.

9. An apparatus comprising:

a processor;

a display to operate a user interface; and a machine-readable storage medium that stores instructions, the machine-readable storage medium operably coupled to the processor such that the instructions, when executed by the processor, cause the apparatus to perform operations comprising:

identifying media files which were chosen in a system for syncing with a device different from the system, the chosen media files being media files identified in a user interface of the system;

determining whether the chosen media files have a combined size that is greater than available space for storage of media on the device;

in response to the combined size of the chosen media files being greater than available space for storage of media on the device, selecting media files from the chosen media files to automatically fill the available space for storage of media on the device, the selected media files being less than all the chosen media files by randomly selecting a first media file from the chosen media files;

determining whether the first media file has a size that is less than a maximum level available for storage of media on the device and marking the first media file for sync if the first media file has a size that is less than the maximum level available for storage of media on the device;

randomly selecting a second media file from the chosen media files;

determining whether the second media file has a size that is less than an adjusted maximum level available for storage of media on the device, the adjusted maximum level based on determining whether the size of the first media file is less than the maximum level and marking the second media file for sync if the second media file has a size that is less than the adjusted maximum level available for storage of media on the device; and continuing the random selection and size determination of media files from the chosen media files until no further randomly selected media file has a size less than a final adjusted maximum level.

10. The apparatus of claim 9, wherein selecting media files from the chosen media files includes selecting the media files using a weighted algorithm.

11. The apparatus of claim 9, further comprising:

maintaining the user interface to only identify all the chosen media files for syncing to the device.

12. The apparatus of claim 9, wherein selecting media files from the chosen media files includes selecting the media files having a size less than a threshold limit.

13. The apparatus of claim 9, wherein the chosen media files and the selected media files include music files.

\* \* \* \* \*